United States Patent
Bastelberger et al.

(10) Patent No.: US 7,183,358 B2
(45) Date of Patent: Feb. 27, 2007

(54) HYDROPHOBICALLY MODIFIED POLYMERS

(75) Inventors: Thomas Bastelberger, Emmerting (DE); Reinhard Härzschel, Burghausen (DE); Franz Jodlbauer, Marktl (DE)

(73) Assignee: Wacker Polymer Systems GmbH & Co. KG, Burghausen (DE)

(*) Notice: Subject to any disclaimer, the term of this patent is extended or adjusted under 35 U.S.C. 154(b) by 0 days.

(21) Appl. No.: 10/463,165

(22) Filed: Jun. 17, 2003

(65) Prior Publication Data

US 2004/0019141 A1    Jan. 29, 2004

(30) Foreign Application Priority Data

Jul. 25, 2002  (DE) ............................. 102 33 933

(51) Int. Cl.
  C08L 23/00 (2006.01)
  C08L 83/00 (2006.01)
  C08K 5/09 (2006.01)
  C08K 5/101 (2006.01)
  C08K 5/5419 (2006.01)

(52) U.S. Cl. ............... 525/269; 524/261; 524/262; 524/267; 524/268; 524/284; 524/317; 524/318; 524/322

(58) Field of Classification Search ............... 524/4, 524/5, 58, 236, 262, 263, 264, 267, 268, 524/269, 284, 312, 314, 317, 318, 322, 394, 524/399, 400, 261
See application file for complete search history.

(56) References Cited

U.S. PATENT DOCUMENTS

| | | | |
|---|---|---|---|
| 3,062,677 A * | 11/1962 | Wong | 428/381 |
| 3,294,709 A * | 12/1966 | Nitzsche et al. | 524/262 |
| 3,703,491 A * | 11/1972 | Takayama et al. | 524/267 |
| 5,702,828 A * | 12/1997 | Adler et al. | 428/540 |
| 5,753,733 A * | 5/1998 | Eck et al. | |
| 5,763,508 A * | 6/1998 | Hess et al. | |
| 5,959,017 A * | 9/1999 | Eck et al. | 524/425 |
| 6,153,673 A * | 11/2000 | Lemos et al. | 524/5 |
| 6,162,839 A * | 12/2000 | Klauck et al. | 521/83 |
| 6,268,423 B1* | 7/2001 | Mayer et al. | 524/492 |
| 6,379,751 B1* | 4/2002 | Schafer et al. | |
| 6,429,239 B1* | 8/2002 | Eck et al. | 524/5 |
| 6,547,874 B2* | 4/2003 | Eck et al. | 106/772 |
| 6,566,434 B1* | 5/2003 | Mayer et al. | 524/425 |
| 2002/0040666 A1* | 4/2002 | Eck et al. | |

FOREIGN PATENT DOCUMENTS

| | | | |
|---|---|---|---|
| DE | 19535833 | * | 3/1997 |
| EP | 765898 | * | 4/1997 |
| EP | 913 425 | * | 10/1998 |
| EP | 1 120 384 | * | 8/2001 |
| JP | 05000836 A | * | 1/1993 |
| WO | WO 85/03511 | * | 8/1985 |
| WO | WO 95/20627 | * | 8/1995 |
| WO | WO 00/32684 | * | 6/2000 |
| WO | WO 02/31036 | * | 4/2002 |

OTHER PUBLICATIONS

Translation to JP 05-000836.*
Patent Abstract of Japan corresponding to JP 11043417.
Derwent Abstract corresponding to EP 913425 [AN 1999-265614].
Derwent Abstract corresponding to WO 95/20627 AN [1995-269863].
Derwent Abstract corresponding to WO 02/31036 AN [2002-620075].
Derwent Abstract corresponding to EP 765898 AN [1996-426222].
Derwent Abstract corresponding to DE 19535833 AN [1997-193873].
Noll, Chemie & Technologie Der Silicone, 2nd E., 1968, Weinheim.
Houben-Weyl, Method Der Organischen Chemie, vol. E20, Georg Thieme Verlag, Stuttgart (1987).
Fox, T.G., Bull. Am. Physics Soc., 1, 3, p. 123 (1956).
Polymer Handbook, 2nd Ed., J. Wiley & Sons, New York (1975).

* cited by examiner

*Primary Examiner*—Kelechi C. Egwim
(74) *Attorney, Agent, or Firm*—Brooks Kushman P.C.

(57) ABSTRACT

Hydrophobically modified polymer compositions contain at least one polymer based on one or more ethylenically unsaturated monomers, in the form of an aqueous polymer dispersions or water-redispersible polymer powder prepared therefrom, further containing, a) one or more silanes, polysilanes, oligosiloxanes, polysiloxanes, carbosilanes, polycarbosilanes, carbosiloxanes, polycarbosiloxanes, polysilylenedisiloxanes, and b) one or more fatty compounds from the group of the fatty acids having from 8 to 22 carbon atoms, their metal soaps, their amides, and their esters with monohydric alcohols having from 1 to 8 carbon atoms, with glycol, with polyglycol, with polyalkylene glycol, with glycerol, with mono-, di-, or triethanolamine, or with monosaccharides.

27 Claims, No Drawings

HYDROPHOBICALLY MODIFIED POLYMERS

BACKGROUND OF THE INVENTION

1. Field of the Invention

The invention relates to hydrophobically modified polymers in the form of their aqueous polymer dispersions and water-redispersible polymer powders.

2. Background Art

Aqueous dispersions and water-redispersible powders based on homo- or copolymers of ethylenically unsaturated monomers are known. They are used in the construction sector as binders, where appropriate in combination with hydraulically setting binders such as cement. Examples are found in construction adhesives, plasters and renderings, mortars, and paints. However, they are also used as binders in coating compositions and adhesives and as textile binders, where addition of polymer dispersions or dispersion powders often serves to improve mechanical strength and adhesion. In some application sectors, especially in plasters, renderings, or construction adhesives, demands include reduction of water absorption or water-repellent action, along with improvement in adhesion. To comply with this set of requirements, use is made of hydrophobicized polymer dispersions or hydrophobicized dispersion powders.

WO-A 95/20627 describes hydrophobicized water-redispersible dispersion powders in which the hydrophobicizing additive present comprises organosilicon compounds such as silanes or siloxanes. A disadvantage of silane-hydrophobicized polymer compositions is that these are very effective on silaceous surfaces but do not give adequate hydrophobicization on lime- and carbonate-containing surfaces. WO-A 02/31036 discloses the hydrophobicization of dispersion powders by means of carboxylic esters of polyhydroxy compounds as the alcohol component. EP-A 765898 describes the production of construction materials with low air-pore content by way of dispersion powders which comprise fatty esters.

SUMMARY OF THE INVENTION

An object of the invention was to provide polymer compositions which both in the form of their aqueous dispersions and in the form of their water-redispersible polymer powders have hydrophobicizing action, are suitable for use in the aforementioned construction materials, as binders and adhesives, etc. This and other objects are provided by polymer compositions containing both organosilicon compounds and a fatty compound.

DETAILED DESCRIPTION OF THE PREFERRED EMBODIMENT(S)

The invention thus provides a hydrophobically modified polymer composition containing at least one polymer based on one or more ethylenically unsaturated monomers, in the form of their aqueous polymer dispersions and water-redispersible polymer powders, wherein the polymer composition also comprises a) one or more organosilicon compounds from the group of the silanes, polysilanes, oligosiloxanes, polysiloxanes, carbosilanes, polycarbosilanes, carbosiloxanes, polycarbosiloxanes, polysilylenedisiloxanes, and b) one or more compounds from the group of the fatty acids having from 8 to 22 carbon atoms, their metal soaps, their amides, and also their esters with monohydric alcohols having from 1 to 8 carbon atoms, with glycols, with polyglycols, with polyalkylene glycols, with glycerol, with mono-, di-, or triethanolamines, or with monosaccharides.

Suitable organosilicon compounds are silicic esters $Si(OR')_4$, tetraorganosilanes $SiR_4$, organoorganoxysilanes $SiR_n(OR')_{4-n}$ where n is from 1 to 3, polysilanes of the general formula $R_3Si(SiR_2)_nSiR_3$, where n is from 0 to 500, organosilanols $SiR_n(OH)_{4-n}$, di-, oligo-, and polysiloxanes composed of units of the general formula $R_cH_dSi(OR')_e(OH)_fO_{(4-c-d-e-f)/2}$, where c is from 0 to 3, d is from 0 to 1, e is from 0 to 3, f is from 0 to 3 and c+d+e+f is not more than 3.5 per unit, where R is identical or different and is a branched or unbranched alkyl radical having from 1 to 22 carbon atoms, cycloalkyl radicals having from 3 to 10 carbon atoms, an alkylene radical having from 2 to 4 carbon atoms, or an aryl, aralkyl, or alkylaryl radical having from 6 to 18 carbon atoms, and R' is an identical or different alkyl radical or alkoxyalkylene radical each having from 1 to 4 carbon atoms, preferably a methyl or ethyl radical, and where the radicals R and R' may also substitution by halogens such as Cl, by ether, thioether, ester, amide, nitrile, hydroxy, amine, carboxy, sulfonic acid, carboxylic anhydride, or carbonyl groups, and where in the case of the polysilanes, R can also have the meaning OR'.

As component a), preference is given to tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydropolysiloxanes end-capped with trimethylsiloxy groups, copolymers end-capped with trimethylsiloxy groups and composed of dimethylsiloxane units and methylhydrosiloxane units, dimethylpolysiloxanes, and also dimethylpolysiloxanes whose terminal units have Si—OH groups.

The organoorganoxysilanes $SiR_n(OR')_{4-n}$, where n is from 1 to 3, are most preferred, in particular isooctyltriethoxysilane, n-octyltriethoxysilane, and hexadecyltriethoxysilane. The organosilicon compounds may be used alone or in a mixture. The amount of component a) generally used is from 0.1 to 20% by weight, preferably from 1 to 10% by weight, based in each case on polymer weight.

The preparation of the organosilicon compounds mentioned may use processes as described in Noll, CHEMIE UND TECHNOLOGIE DER SILICONE [CHEMISTRY AND TECHNOLOGY OF SILICONES], 2nd edition 1968, Weinheim, and in Houben-Weyl, "Methoden der organischen Chemie" ["Methods of Organic Chemistry"], volume E20, Georg Thieme Verlag, Stuttgart (1987).

Suitable compounds for component b) are generally fatty acids and fatty acid derivatives which under alkaline conditions (pH≧8) liberate fatty acid or the corresponding fatty acid anion. Suitable fatty acids are branched or unbranched ("optionally branched"), saturated or unsaturated fatty acids having from 8 to 22 carbon atoms. Examples are lauric acid (n-dodecanoic acid), myristic acid (n-tetradecanoic acid), palmitic acid (n-hexadecanoic acid), stearic acid (n-octadecanoic acid), and oleic acid (9-dodecenoic acid). Preference is given to the unsaturated fatty acids, in particular oleic acid. Suitable metal soaps are those of the abovementioned fatty acids with metals of the 1st to 3rd main groups of the Periodic Table of the Elements. Preference is given to metal soaps with lithium, sodium, potassium, magnesium, calcium, or aluminum, particularly in the case of the unsaturated fatty acids. Suitable fatty amides include those fatty amides obtainable by reacting mono-, di-, or triethanolamine with the abovementioned fatty acids.

Fatty esters suitable as component b) include the $C_1$–$C_8$-alkyl esters of the $C_8$–$C_{22}$ fatty acids, preferably the methyl, ethyl, propyl, butyl, or ethylhexyl esters. The mono- and diglycol esters of the $C_8$–$C_{22}$ fatty acids are also suitable. Other examples are the mono- and diesters of polyglycols and/or of polyalkylene glycols having up to 12 oxyalkylene units, e.g. polyethylene glycol and polypropylene glycol. The mono-, di-, and triesters of glycerol with the $C_8$–$C_{22}$ fatty acids are also suitable, as are the mono-, di-, and triesters of mono-, di-, or triethanolamine with the $C_8$–$C_{22}$ fatty acids. The fatty esters of sorbitol and mannitol are also suitable. Particular preference is given to the mono- and diglycol esters of lauric acid and of oleic acid, and also to the mono-, di-, and triesters of glycerol with lauric acid or with oleic acid. The corresponding esters of the unsaturated fatty acids, such as those of oleic acid, are most preferred. Mixed esters are of course useful also.

The fatty acids and fatty acid derivatives mentioned may be used alone or in a mixture. The amount of component b) generally used is from 0.5 to 30% by weight, preferably from 1 to 10% by weight, based in each case on polymer weight.

Suitable ethylenically unsaturated monomers include vinyl esters of unbranched or branched ("optionally branched") alkylcarboxylic acids having from 1 to 18 carbon atoms, acrylic or methacrylic esters of branched or unbranched alcohols or diols having from 1 to 18 carbon atoms, dienes, olefins, vinylaromatics, and vinyl halides, individually or as mixtures.

Suitable vinyl esters include those of carboxylic acids having from 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 13 carbon atoms, e.g. VeoVa®9, VeoVa®10, or VeoVa®11, trademarks of Resolution. Vinyl acetate is particularly preferred.

Suitable acrylic or methacrylic ester monomers include esters of unbranched or branched alcohols having from 1 to 18 carbon atoms. Preferred (meth)acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Particular preference is given to methyl acrylate, methyl methacrylate, n-butyl acrylate, tert-butyl acrylate, and 2-ethylhexyl acrylate.

Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

Where appropriate, it is also possible to copolymerize from 0.1 to 50% by weight of auxiliary monomers, based on the total weight of the monomer mixture. It is preferable to use from 0.5 to 15% by weight of auxiliary monomers. Examples of auxiliary monomers are ethylenically unsaturated mono- and dicarboxylic acids, preferably acrylic acid, methacrylic acid, fumaric acid, or maleic acid; ethylenically unsaturated carboxamides and ethylenically unsaturated carbonitriles, preferably acrylamide or acrylonitrile; mono- and diesters of fumaric or maleic acid, e.g. the diethyl and diisopropyl esters; maleic anhydride; and ethylenically unsaturated sulfonic acids and salts of these, preferably vinylsulfonic acid and 2-acrylamido-2-methylpropanesulfonic acid. Other examples are pre-crosslinking monomers, such as polyethylenically unsaturated comonomers, e.g. divinyl adipate, diallyl maleate, diallyl phthalate, allyl methacrylate or triallyl cyanurate, or post-crosslinking comonomers, e.g. acrylamidoglycolic acid (AGA), methyl methylacrylamidoglycolate (MAGME), N-methylolacrylamide (NMA), N-methylolmethacrylamide, allyl N-methylolcarbamate, alkyl ethers or esters such as the isobutoxy ether of N-methylolacrylamide, of N-methylolmethacrylamide, or of allyl N-methylolcarbamate. Epoxy-functional comonomers such as glycidyl methacrylate and glycidyl acrylate, are also suitable. Other examples are silicon-functional comonomers, such as acryloxypropyltri(alkoxy)- and methacryloxypropyltri(alkoxy)silanes, vinyltrialkoxysilanes, and vinylmethyldialkoxysilanes, examples of alkoxy groups which may be present being ethoxy and ethoxypropylene glycol ether radicals. Mention may also be made of monomers having hydroxy or CO groups, e.g. hydroxyalkyl esters of methacrylic or acrylic acid, for example hydroxyethyl, hydroxypropyl, or hydroxybutyl acrylate, and hydroxyethyl, hydroxypropyl, or hydroxybutyl methacrylate, and also of compounds such as diacetoneacrylamide, acetylacetoxyethyl acrylate, and acetylacetoxyethyl methacrylate.

Particular preference is given to polymers of one or more of vinyl acetate, vinyl esters of α-branched monocarboxylic acids having from 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene.

Greatest preference is given to:

polymers of vinyl acetate, if desired, also with ethylene;

polymers of vinyl acetate, ethylene, and a vinyl ester of α-branched monocarboxylic acids having from 9 to 13 carbon atoms;

polymers of n-butyl acrylate with 2-ethylhexyl acrylate and/or methyl methacrylate;

polymers of styrene with one or more monomers from the group consisting of methyl acrylate, ethyl acrylate, propyl acrylate, n-butyl acrylate, 2-ethylhexyl acrylate, and 1,3-butadiene; and polymers of vinyl acetate with one or more monomers from the group consisting of methyl acrylate, ethyl acrylate, propyl acrylate, n-butyl acrylate, and 2-ethylhexyl acrylate, and, where appropriate, ethylene, where the polymers mentioned may also contain one or more of the abovementioned auxiliary monomer units.

The selection of monomers and the selection of the proportions by weight of any comonomers is such as to give a glass transition temperature Tg of from −50° C. to +120° C., preferably from −30° C. to +95° C. The glass transition temperature Tg of the polymers can be determined in a known manner by differential scanning calorimetry (DSC). Tg may also be approximated in advance by means of the Fox equation. According to T. G. Fox., BULL. AM. PHYSICS SOC. 1, 3, page 123 (1956): $1/Tg = x_1/Tg_1 + x_2/Tg_2 + \ldots + x_n/Tg_n$ where $x_n$ fraction by weight (% by weight/100) of the monomer n, and $Tg_n$ is the glass transition temperature in Kelvin of the homopolymer of the monomer n. Tg values for homopolymers are listed in POLYMER HANDBOOK 2nd Edition, J. Wiley & Sons, New York (1975).

The polymers are prepared in a manner known per se by the emulsion polymerization process or by the suspension polymerization process, in the presence of protective colloids and/or of emulsifiers. Preference is given to the emulsion polymerization process, the polymerization temperature generally being from 40° C. to 100° C., preferably from 60° C. to 90° C. When gaseous comonomers are copolymerized, e.g. ethylene, 1,3-butadiene or vinyl chloride, operation may also be carried out at superatmospheric pressure, generally at from 5 to 100 bar.

The polymerization is initiated using the water-soluble or monomer-soluble initiators commonly used for emulsion or suspension polymerization, or redox-initiator combinations. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators generally used, based on the total weight of the monomers, is from 0.01 to 0.5% by weight. Redox initiators used are combinations of the above initiators with reducing agents. Suitable reducing agents are the sulfites and bisulfites of the alkali metals and of ammonium, e.g. sodium sulfite, the derivatives of sulfoxylic acid, e.g. the formaldehydesulfoxylate of zinc or of an alkali metal, e.g. sodium hydroxymethanesulfinate, and ascorbic acid. The amount of reducing agent is preferably from 0.01 to 0.5% by weight, based on the total weight of the monomers.

Regulating substances (chain transfer agents) may be used during the polymerization to control molecular weight. If regulators are used, the amounts usually used are from 0.01 to 5.0% by weight, based on the monomers to polymerized, either as a separate feed, or pre-mixed with reaction components. Examples of these substances include n-dodecyl mercaptan, tert-dodecyl mercaptan, mercaptopropionic acid, methyl mercaptopropionate, isopropanol, and acetaldehyde. It is preferable to use no regulating substances.

Suitable protective colloids are partially hydrolyzed polyvinyl alcohols; polyvinylpyrrolidones; polyvinyl acetals; polysaccharides in water-soluble form, e.g. starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, vinyl ether-maleic acid copolymers. Preference is given to partially hydrolyzed or completely hydrolyzed polyvinyl alcohols.

The total amount of the protective colloids generally used in the polymerization is from 1 to 20% by weight, based on the total weight of the monomers. It is possible for all of the protective colloid content to form an initial charge, or else to be divided between initial charge and feed.

It is preferable to operate without adding emulsifier. Where appropriate, it is possible to use from 0.1 to 5% by weight of emulsifiers, based on the amount of monomers. Suitable emulsifiers are either anionic, cationic, or else non-ionic emulsifiers, e.g. anionic surfactants, such as alkyl sulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or with alkylphenols, and nonionic surfactants, such as alkyl polyglycol ethers or alkylaryl polyglycol ethers having from 8 to 40 ethylene oxide units.

All of the monomers may be present in the initial charge, all may be supplied as a feed, or some of the monomers may be present in the initial charge, the remainder fed in after initiation of the polymerization. The procedure is preferably that from 50 to 100% by weight of the monomers, based on their total weight, form the initial charge, the remainder supplied as a feed. The feeds may be separate (in space and time) or some or all of the components may be fed in pre-emulsified form. Once the polymerization has been concluded, post-polymerization may be carried out using known methods to remove residual monomers, for example using redox-catalyst-initiated post-polymerization. Volatile residual monomers may also be removed by means of distillation, preferably at subatmospheric pressure, optionally with passage of inert entrainer gases, such as air, nitrogen, or steam, through or over the product. The aqueous polymer dispersions preferably have a solids content from 30 to 75% by weight, more preferably from 50 to 60% by weight.

To prepare the polymer powders, the aqueous dispersions, optionally after addition of protective colloids as spraying aids, are dried, for example by means of fluidized-bed drying, freeze drying, or spray drying. The dispersions are preferably spray-dried. Spray drying takes place in conventional spray-drying systems, and atomization may be by means of single-, twin-, or multifluid nozzles, or may use a rotation disk, etc. The discharge temperature selected is generally in the range from 45° C. to 120° C., preferably from 60° C. to 90° C., depending on the system, the Tg of the resin, and the desired degree of drying.

In the case of the drying process to give water-redispersible polymer powders, use is generally made of a total amount of from 3 to 30% by weight of a spraying aid, based on the polymeric constituents of the dispersion. This means that the total amount of protective colloid prior to the drying procedure is to be at least from 3 to 30% by weight, based on polymer content; it is preferable to use from 5 to 20% by weight, based on polymer content.

Suitable spraying aids are partially hydrolyzed polyvinyl alcohols; polyvinylpyrrolidones; polysaccharides in water-soluble form, such as starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, and vinyl ether-maleic acid copolymers. It is preferable to use no protective colloids other than polyvinyl alcohols as spraying aid.

A content of up to 1.5% by weight of antifoam, based on the base polymer, has frequently proven advantageous during spraying. The resultant powder may be provided with an antiblocking agent (anticaking agent), preferably in amounts of up to 30% by weight, based on the total weight of polymeric constituents, in order to increase storage stability by improving blocking resistance, in particular in the case of powders with low glass transition temperature. Examples of antiblocking agents are calcium carbonate, magnesium carbonate, talc, gypsum, silica, kaolins, and silicates with particle sizes preferably in the range from 10 nm to 10 µm.

The viscosity of the dispersion for spraying is preferably adjusted, by way of the solids content, to give a value of <500 mPas (Brookfield viscosity at 20 rpm and 23° C.), preferably <250 mPas. The solids content of the dispersion for spraying is >35%, preferably >40%.

Other additives may be added during spraying to improve performance characteristics. Examples of other constituents of dispersion powder compositions present in preferred embodiments are pigments, fillers, and foam stabilizers.

The hydrophobicizing components a) and b) may be added during the polymerization, or may be added to the polymer dispersion after the polymerization process has ended. Preference is given to addition to the polymer dispersion after completion of the polymerization. A similar procedure can be used to hydrophobicize pulverulent compositions, where the drying step follows admixture of the components a) and b) to the polymer dispersion. Another possible procedure involves adding the components a) and b) in powder form to the polymer powder during or after the drying process. If the components a) or b) are in liquid form, the procedure described in DE-A 19535833 for modifying powders can be used, the liquid components being applied to a pulverulent carrier, admixture of this carrier taking place during or after the drying process.

The hydrophobically modified polymer dispersions and polymer powders may be used in their typical application sectors, for example in chemical products for the construction industry, where appropriate in combination with hydraulically setting binders such as cements (Portland, alumina, pozzolanic, slag, magnesia, or phosphate cement), or water glass, or in gypsum-containing compositions, in lime-containing compositions, or in cement-free, polymer-bound compositions, for the production of construction adhesives, in particular tile adhesives and exterior insulation system adhesives, plasters or renderings, troweling compositions, floor-filling compositions, self-leveling compositions, sealing slurries, jointing mortars, or paints. They may also be used as binders for coating compositions or adhesive compositions, or as agents for the coating or binding of textiles, fibers, wood, or paper.

The examples below serve for further illustration of the invention:

Dispersions Used:

D1: Polyvinyl-alcohol-stabilized terpolymer dispersion based on vinyl acetate-vinyl versatate (VeoVa®10)-ethylene with a glass transition temperature of about 5° C. and a solids content of 54%

D2: Polyvinyl-alcohol-stabilized terpolymer dispersion based on vinyl acetate-VeoVa®10-vinyl laurate with a glass transition temperature of about 15° C. and a solids content of 53%

D3: Polyvinyl-alcohol-stabilized terpolymer dispersion based on vinyl chloride-ethylene-vinyl laurate with a glass transition temperature of about 1° C. and a solids content of 50%.

EXAMPLE 1 (COMPARATIVE EXAMPLE)

100 parts by weight of dispersion D1 were combined with 8 parts by weight of a polyvinyl alcohol with hydrolysis index of 140, or a degree of hydrolysis of 88 mol %, and sprayed using a twin-fluid nozzle (at 4 bar and 125° C.). The dry powder was blended with 15 parts by weight of a commercially available antiblocking agent based on Ca/Mg carbonate and Mg hydrosilicate.

EXAMPLE 1a (COMPARATIVE EXAMPLE)

100 parts by weight of dispersion D1 were combined with 8 parts by weight of a polyvinyl alcohol with hydrolysis index of 140, or a degree of hydrolysis of 88 mol %, and with 4 parts by weight of isooctyltriethoxysilane, and sprayed using a twin-fluid nozzle (at 4 bar and 125° C.). The dry powder was blended with 15 parts by weight of a commercially available antiblocking agent based on Ca/Mg carbonate and Mg hydrosilicate.

EXAMPLE 1b

In addition to the components of example 1a, 0.6 part by weight of a naturally occurring ester of glycerol and unsaturated fatty acids predominantly having from 12 to 18 carbon atoms was added. The dry powder was blended with 15 parts by weight of a commercially available antiblocking agent based on Ca/Mg carbonate and Mg hydrosilicate.

EXAMPLE 1c (COMPARATIVE EXAMPLE)

100 parts by weight of dispersion D1 were combined with 6 parts by weight of a polyvinyl alcohol with hydrolysis index of 140, or a degree of hydrolysis of 88 mol %, and with 0.6 part by weight of a naturally occurring triglyceride of predominantly unsaturated fatty acids predominantly having from 12 to 18 carbon atoms, and sprayed. The dry powder was blended with 15 parts by weight of a commercially available antiblocking agent based on Ca/Mg carbonate and Mg hydrosilicate.

EXAMPLE 2b:

100 parts by weight of dispersion D1 were combined with 6 parts by weight of a polyvinyl alcohol with hydrolysis index of 140, or a degree of hydrolysis of 88 mol %, with 4 parts by weight of isooctyltriethoxysilane, and with 0.6 part by weight of diethylene glycol monooleate, and sprayed. The dry powder was blended with 15 parts by weight of a commercially available antiblocking agent based on Ca/Mg carbonate and Mg hydrosilicate.

EXAMPLE 2c (COMPARATIVE EXAMPLE)

100 parts by weight of dispersion D1 were combined with 6 parts by weight of a polyvinyl alcohol with hydrolysis index of 140, or a degree of hydrolysis of 88 mol %, and with 0.6 part by weight of diethylene glycol monooleate, and sprayed. The dry powder was blended with 15 parts by weight of a commercially available antiblocking agent based on Ca/Mg carbonate and Mg hydrosilicate.

EXAMPLE 3b 100 parts by weight of dispersion D1 were combined with 8 parts by weight of a polyvinyl alcohol with hydrolysis index of 140, or a degree of hydrolysis of 88 mol %, with 5 parts by weight of isooctyltriethoxysilane, and with 0.6 part by weight of a mixture of the methyl esters of lauric and myristic acids, and sprayed. The dry powder was blended with 15 parts by weight of a commercially available antiblocking agent based on Ca/Mg carbonate and Mg hydrosilicate.

EXAMPLE 3c (COMPARATIVE EXAMPLE)

100 parts by weight of dispersion D1 were combined with 6 parts by weight of a polyvinyl alcohol with hydrolysis index of 140, or a degree of hydrolysis of 88 mol %, and with 0.6 part by weight of a mixture of the methyl esters of lauric and myristic acids, sprayed, and blended as described above with antiblocking agent.

EXAMPLE 4b 100 parts by weight of dispersion D1 were combined with 6 parts by weight of a polyvinyl alcohol with hydrolysis index of 140, or a degree of hydrolysis of 88 mol %, with 4 parts by weight of isooctyltriethoxysilane, and with 0.6 part of triethanolamine dioleate, sprayed, and blended as described above with antiblocking agent.

EXAMPLE 5b 100 parts by weight of dispersion D1 were combined with 6 parts by weight of a polyvinyl alcohol with hydrolysis index of 140, or a degree of hydrolysis of 88 mol %, with 4 parts by weight of isooctyltriethoxysilane, and with 0.6 part of lauric acid, sprayed, and blended as described above with antiblocking agent.

EXAMPLE 6 (COMPARATIVE EXAMPLE)

100 parts by weight of dispersion D2 were combined with 6 parts by weight of a polyvinyl alcohol with hydrolysis index of 140, or a degree of hydrolysis of 88 mol %, sprayed, and blended as described above with antiblocking agent.

EXAMPLE 6a (COMPARATIVE EXAMPLE)

100 parts by weight of dispersion D2 were combined with 6 parts by weight of a polyvinyl alcohol with hydrolysis index of 140, or a degree of hydrolysis of 88 mol %, and with 4 parts by weight of isooctyltriethoxysilane, sprayed, and blended as described above with antiblocking agent.

EXAMPLE 6b 100 parts by weight of dispersion D2 were combined with 6 parts by weight of a polyvinyl alcohol with hydrolysis index of 140, or a degree of hydrolysis of 88 mol %, with 4 parts by weight of isooctyltriethoxysilane, and with 4 parts by weight of methyl oleate, sprayed, and blended as described above with antiblocking agent.

EXAMPLE 6c (COMPARATIVE EXAMPLE)

100 parts by weight of dispersion D2 were combined with 6 parts by weight of a polyvinyl alcohol with hydrolysis index of 140, or a degree of hydrolysis of 88 mol %, and with 4 parts by weight of methyl oleate, sprayed, and blended as described above with antiblocking agent.

EXAMPLE 7 (COMPARATIVE EXAMPLE)

100 parts by weight of dispersion D3 were combined with 10 parts by weight of a polyvinyl alcohol with hydrolysis index of 140, or a degree of hydrolysis of 88 mol %, sprayed, and blended as described above with antiblocking agent.

EXAMPLE 7a (COMPARATIVE EXAMPLE)

100 parts by weight of dispersion D3 were combined with 10 parts by weight of a polyvinyl alcohol with hydrolysis index of 140, or a degree of hydrolysis of 88 mol %, and with 4 parts by weight of isooctyltriethoxysilane, sprayed, and blended as described above with antiblocking agent.

EXAMPLE 7b 100 parts by weight of dispersion D3 were combined with 10 parts by weight of a polyvinyl alcohol with hydrolysis index of 140, or a degree of hydrolysis of 88 mol %, with 4 parts by weight of isooctyltriethoxysilane, and with 4 parts by weight of methyl oleate, sprayed, and blended as described above with antiblocking agent.

EXAMPLE 7c (COMPARATIVE EXAMPLE)

100 parts by weight of dispersion D3 were combined with 10 parts by weight of a polyvinyl alcohol with hydrolysis index of 140, or a degree of hydrolysis of 88 mol %, and with 4 parts by weight of methyl oleate, sprayed, and blended as described above with antiblocking agent.

EXAMPLE 8b 95 parts by weight of dispersion powder from Comparative Example 1a were dry-blended with 5 parts by weight of pulverulent sodium oleate in a plowshare mixer.

EXAMPLE 8c (COMPARATIVE EXAMPLE)

95 parts by weight of dispersion powder from Comparative Example 1 were dry-blended with 5 parts by weight of pulverulent sodium oleate in a plowshare mixer.

Performance Testing:

The hydrophobicizing action of the substances mentioned was determined by using a dry mortar with the following composition (Table), in parts by weight:

TABLE 1

| | |
|---|---|
| 280.0 | Dyckerhoff Weiβzement (White Portland Cement) |
| 500.0 | Quartz sand (0.1–0.4 mm) |
| 190.0 | JURAPERLE MHS (calcium carbonate) |
| 1.5 | TYLOSE MH 10001 P4 (methylhydroxyethylcellulose) |
| X | Dispersion powder |

Water was added in an amount of 24 parts per 100 parts dry mix.

Test for Water Absorption:

A mortar layer of thickness 4 mm was troweled onto aerated concrete. The edges of the specimens were sealed, and the specimens were immersed in water with the mortar layer downward. The water absorption in $kg/m^2h^{0.5}$ was then determined from the increase in weight per square meter and the time.

The test results are listed in the tables below.

Examples X are comparative examples without hydrophobicizing additives. Examples Xa are comparative examples where only silane is present as hydrophobicizing additive. Examples Xb are examples according to the invention. Examples Xc are comparative examples where only fatty acid (derivatives) are present as hydrophobicizing additive.

Water absorption can be markedly reduced in comparison with unmodified powders (examples X) by silane (examples Xa). Fatty acid (derivatives) alone (examples Xc) are much less effective. However, the combination of silane (component a)) with fatty acid (derivative) (component b)) exhibits a synergistic interaction between the two components, since although component b) alone is much less effective than the silane, in the combination it markedly increases the hydrophobicizing action of the silane.

The test results in Table 2 were achieved using 7.5 parts by weight of dispersion powder in the dry mortar mixing specification (water absorption in kg/m$^2$h$^{0.5}$)

TABLE 2

| Comp. Ex. 6 | Comp. Ex. 6a | Ex. 6b | Comp. Ex. 6c |
|---|---|---|---|
| 1.5 | 0.19 | 0.14 | 0.5 |
| Comp. Ex. 7 | Comp. Ex. 7a | Ex. 7b | Comp. Ex. 7c |
| 1.4 | 0.20 | 0.06 | 0.8 |

The test results in Table 3 were achieved using 10 parts by weight of dispersion powder in the dry mortar mixing specification (water absorption in kg/m$^2$h$^{0.5}$):

| Comp. Ex. 1 | Comp. Ex. 1a | Ex. 8b | Comp. Ex. 8c |
|---|---|---|---|
| 1.8 | 0.5 | 0.06 | 1.7 |

Test results using 20 parts by weight of dispersion powder in the dry mortar mixing specification (water absorption in kg/m$^2$h$^{0.5}$) are set forth in Table 3:

TABLE 3

| Comp. Ex. 1 | Comp. Ex. 1a | Ex. 1b | Comp. Ex. 1c |
|---|---|---|---|
| 1.8 | 0.10 | 0.05 | 1.9 |
|  |  | Ex. 2b | Comp. Ex. 2c |
|  |  | 0.04 | 1.8 |
|  |  | Ex. 3b | Ex. 3c |
|  |  | 0.03 | 1.8 |
|  |  | Ex. 4b |  |
|  |  | 0.07 |  |
|  |  | Ex. 5b |  |
|  |  | 0.07 |  |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydrophobically modified water-redispersible polymer powder composition, comprising:
   a) at least one addition polymer derived from polymerization of one or more ethylenically unsaturated monomers and stabilized by at least one protective colloid;
   b) from 0.1 to 20 weight percent, based on the weight of the addition polymer(s), of one or more organosilicon compounds selected from the group consisting of silanes, polysilanes, oligosiloxanes, polysiloxanes, carbosilanes, polycarbosilanes, carbosiloxanes, polycarbosiloxanes, and polysilylenedisiloxane organosilicon compounds; and
   c) one or more fatty compounds selected from the group consisting of $C_{8-22}$ fatty acids, $C_{8-22}$ fatty acid amides, $C_{8-22}$ fatty acid esters with $C_{1-8}$ monohydric alcohol(s), $C_{8-22}$ fatty acid esters of glycol(s), $C_{8-22}$ fatty acid esters of polyglycol(s), $C_{8-22}$ fatty acid esters of polyalkylene glycol(s), $C_{8-22}$ fatty acid esters of glycerol, $C_{8-22}$ fatty acid esters of mono-, di-, or triethanolamine(s), and $C_{8-22}$ fatty acid esters of monosaccharide(s).

2. The hydrophobically modified polymer composition of claim 1, where component b) comprises one or more organosilicon compounds selected from the group consisting of silicic esters Si(OR')$_4$; tetraorganosilanes SiR$_4$; organoorganoxysilanes SiR$_n$(OR')$_{4-n}$ where n is from 1 to 3; polysilanes of the formula R$_3$Si(SiR$_2$)$_n$SiR$_3$ where n is from 0 to 500; organosilanols SiR$_n$(OH)$_{4-n}$ where n is from 1 to 3; di-, oligo-, and polysiloxanes composed of units of the formula R$_c$H$_d$Si(OR')$_e$(OH)$_f$O$_{(4-c-d-e-f)/2}$ where c is from 0 to 3, d is from 0 to 1, e is from 0 to 3, f is from 0 to 3 and c+d+e+f is not more than 3.5 per unit, where R is identical or different and is an optionally branched $C_{1-22}$ alkyl radical, a $C_{3-10}$ cycloalkyl radical, a $C_{2-4}$ alkylene radical, $C_{6-18}$ aryl, $C_{6-18}$ aralkyl, or $C_{6-18}$ alkylaryl radical, and R' is an identical or different alkyl radical or alkoxyalkylene radical each having from 1 to 4 carbon atoms, and where the radicals R and R' are optionally substituted by halogen, by ether, thioether, ester, amide, nitrile, hydroxy, amine, carboxy, sulfonic acid, carboxylic anhydride, or carbonyl groups, and where in the case of the polysilanes, R can also have the meaning OR'.

3. The hydrophobically modified polymer composition of claim 1, where component c) comprises one or more compounds selected from the group consisting of optionally branched, saturated and unsaturated $C_{8-22}$ fatty acids, amides of mono-, di-, or triethanolamine with the $C_8$–$C_{22}$ fatty acids, $C_1$–$C_8$-alkyl esters of the $C_8$–$C_{22}$ fatty acids, mono- and diglycol esters of the $C_8$–$C_{22}$ fatty acids, mono- and diesters of the $C_8$–$C_{22}$ fatty acids with polyglycol(s), mono- and diesters of the $C_{8-22}$ fatty acids with polyalkylene glycols having up to 12 oxyalkylene units, mono-, di-, and triesters of glycerol with the $C_8$–$C_{22}$ fatty acids, the mono-, di-, and triesters of mono-, di-, or triethanolamine with the $C_8$–$C_{22}$ fatty acids, the esters of sorbitol with the $C_8$–$C_{22}$ fatty acids, and the esters of mannitol with the $C_{8-22}$ fatty acids.

4. The hydrophobically modified polymer composition of claim 3, where component c) comprises one or more compounds selected from the group consisting of unsaturated $C_{8-22}$ fatty acids, $C_{8-22}$ fatty acid amides of diethanolamine, $C_{8-22}$ fatty acid $C_1$–$C_8$-alkyl esters, $C_{8-22}$ fatty acid mono- and diglycol esters, $C_{8-22}$ fatty acid mono- and diesters with polyglycols, $C_{8-22}$ fatty acid mono- and diesters with polyalkylene glycols having up to 12 oxyalkylene units, $C_{8-22}$ fatty acid mono-, di-, and triesters with glycerol, and $C_{8-22}$ fatty acid mono-, di-, and triesters with triethanolamine.

5. The hydrophobically modified polymer composition of claim 1, comprising at least one addition polymer based on one or more ethylenically unsaturated monomers selected from the group consisting of vinyl esters of optionally branched $C_{1-18}$ alkylcarboxylic acids, (meth)acrylic esters of optionally branched $C_{1-18}$ alcohols, (meth)acrylic esters of $C_{2-18}$ diols, dienes, olefins, vinylaromatics, and vinyl halides.

6. The hydrophobically modified polymer composition of claim 5, comprising at least one polymer selected from the group consisting of polymers of vinyl acetate and optionally ethylene; polymers of vinyl acetate, ethylene, and a vinyl ester of α-branched $C_{9-13}$ monocarboxylic acids; polymers of n-butyl acrylate with 2-ethylhexyl acrylate and/or methyl methacrylate; polymers of styrene with one or more monomers selected from the group consisting of methyl acrylate, ethyl acrylate, propyl acrylate, n-butyl acrylate, 2-ethylhexyl acrylate, and 1,3-butadiene; polymers of vinyl acetate with one or more monomers selected from the group consisting of methyl acrylate, ethyl acrylate, propyl acrylate, n-butyl acrylate, 2-ethylhexyl acrylate, and optionally ethylene, said polymers optionally containing one or more auxiliary monomers.

7. The composition of claim 1, wherein said addition polymer is a vinyl acetate polymer, a vinyl acetate and ethylene copolymer; or a vinyl acetate, ethylene, and α-branched $C_{9-13}$ monocarboxylic acid vinyl ester copolymer, and wherein component c) comprises one or more esters of $C_{8-22}$ fatty acids with $C_{1-8}$ alkanols, with glycol, with diglycol, or with glycerine.

8. The composition of claim 7, wherein component b) is selected from the group consisting of tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxvsilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydropolysiloxanes end-capped with trimethylsiloxy groups, copolymers end-capped with trimethylsiloxy groups and composed of dimethylsiloxane units and methylhydrosiloxane units, dimethylpolysiloxanes, and also dimethylpolysiloxanes whose terminal units have Si—OH groups, and mixtures thereof.

9. The composition of claim 1, further comprising at least one hydraulically setting binder.

10. The composition of claim 9, wherein at least one said hydraulically setting binder is Portland cement.

11. The polymer composition of claim 1 wherein said organosilicon compound is selected from the group consisting of organoorganooxysilanes $SiR_n(OR'_{4-n})$ wherein n is from 1 to 3, and where R is identical or different and is an optionally branched $C_{1-22}$ alkyl radical, a $C_{3-10}$ cycloalkyl radical, a $C_{2-4}$ alkylene radical, $C_{6-18}$ aryl, $C_{6-18}$ aralkyl, or $C_{6-18}$ alkylaryl radical, and R' is an identical or different alkyl radical or alkoxyalkylene radical each having from 1 to 4 carbon atoms, and where the radicals R and R' are optionally substituted by halogen, by ether, thioether, ester, amide, nitrile, hydroxy, amine, carboxy, sulfonic acid, carboxylic anhydride, or carbonyl groups, and where in the case of the polysilanes R can also have the meaning OR'.

12. A hydrophobically modified water-redispersible polymer powder composition, comprising:
 a) at least one addition polymer derived from polymerization of one or more ethylenically unsaturated monomers and stabilized by at least one protective colloid;
 b) from 0.1 to 20 weight percent, based on the weight of the addition polymer, of tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydropolysiloxanes end-capped with trimethylsiloxy groups, copolymers end-capped with trimethylsiloxy groups and composed of dimethylsiloxane units and methylhydrosiloxane units, dimethylpolysiloxanes, dimethylpolysiloxanes whose terminal units have Si—OH groups, or mixtures thereof and
 c) one or more fatty compounds selected from the group consisting of $C_{8-22}$ fatty acid amides, $C_{8-22}$ fatty acid esters with $C_{1-8}$ monohydric alcohol(s), $C_{8-22}$ fatty acid esters of glycol(s), $C_{8-22}$ fatty acid esters of polyglycol(s), $C_{8-22}$ fatty acid esters of polyalkylene glycol(s), $C_{8-22}$ fatty acid esters of glycerol, $C_{8-22}$ fatty acid esters of mono-, di-, or triethanolamine(s), and $C_{8-22}$ fatty acid esters of monosaccharide(s).

13. The polymer composition of claim 12, wherein the polymer is one selected from the group consisting of vinyl acetate homopolymers; vinyl acetate and ethylene copolymers; vinyl acetate, ethylene, and α-branched $C_{9-13}$ monocarboxylic acid vinyl ester copolymers; n-butyl acrylate and 2-ethylhexyl acrylate copolymers; n-butyl acrylate and methylmethacrylate copolymers; n-butylacrylate, 2-ethylhexylacrylate, and methylmethacrylate copolymers; copolymers of styrene and at least one further monomer selected from the group consisting of methyl acrylate, ethyl acrylate, n-propylacrylate, n-butylacrylate, 2-ethylhexyl acrylate, and butadiene; and copolymers of vinyl acetate optionally with ethylene, and with at least one further monomer selected from the group consisting of methyl acrylate, ethyl acrylate, n-propyl acrylate, n-butyl acrylate, and 2-ethylhexyl acrylate.

14. The polymer composition of claim 12 wherein said organosilicon compound(s) are present in an amount of 1 weight percent to 10 weight percent based on the weight of the polymer.

15. A hydrophobically modified water-redispersible polymer powder composition, comprising:
 a) at least one addition polymer derived from polymerization of one or more ethylenically unsaturated monomers and stabilized by at least one protective colloid;
 b) one or more alkylalkoxysilanes of the formula $SiR_n(OR^1)_{4-n}$ where n is 1 to 3, where R is identical and is a $C_{1-22}$ alkyl radical and $R^1$ is identical or different and is an alkyl radical or an alkoxyalkylene radical each having from 1 to 4 carbon atoms; and
 c) one or more $C_{8-22}$ fatty acid esters of $C_{1-8}$ monohydric alcohols, glycols, diglycols, polyglycols, polyalkylene glycols, or glycerine.

16. The composition of claim 15, wherein component b) is present in an amount of from 1 to 10 weight based on the weight of addition polymer a).

17. The polymer composition of claim 15, wherein said composition further comprises a hydraulically setting inorganic binder.

18. The polymer composition of claim 17, wherein said hydraulically setting inorganic binder includes at least one binder selected from the group consisting of Portland cement, alumina cement, pozzolanic cement, slag cement, magnesia cement, phosphate cement, water glass, gypsum, and lime.

19. The polymer composition of claim 16, wherein said composition further comprises a hydraulically setting inorganic binder.

20. The polymer composition of claim 19, wherein said hydraulically setting inorganic binder includes at least one binder selected from the group consisting of Portland cement, alumina cement, pozzolanic cement, slag cement, magnesia cement, phosphate cement, water glass, gypsum, and lime.

21. The composition of claim 15, wherein at least one addition polymer is a vinyl acetate polymer, a vinyl acetate and ethylene copolymer, or a copolymer of vinyl acetate, ethylene, and a vinyl ester of an α-branched $C_{9-13}$ monocarboxylic acid.

22. A redispersible polymer powder or aqueous redispersion thereof, said redispersible polymer powder comprising:
  a) a protective colloid stabilized addition polymer selected from the group consisting of vinyl acetate homopolymers; vinyl acetate and ethylene copolymers; copolymers of vinyl acetate and at least one further vinyl ester or an α-branched alkyl carboxylic acid; copolymers of vinyl chloride, ethylene, and at least one further vinyl ester of an α-branched alkyl carboxylic acid; copolymers of vinyl chloride and at least one vinyl ester of an α-branched alkyl carboxylic acid; and copolymers of vinyl chloride, ethylene, and at least one vinyl ester of an α-branched alkyl carboxylic acid;
  b) from 0.1 to 20 weight percent, based on the weight of the addition polymer(s), of one or more organosilicon compounds selected from the group consisting of silanes, polysilanes, oligosiloxanes, polysiloxanes, carbosilanes, polycarbosilanes, carbosiloxanes, polycarbosiloxanes, and polysilylenedisiloxane organosilicon compounds; and
  c) one or more fatty compounds selected from the group consisting of $C_{8-22}$ fatty acids, $C_{8-22}$ fatty acid amides, $C_{8-22}$ fatty acid esters with $C_{1-8}$ monohydric alcohol(s), $C_{8-22}$ fatty acid esters of glycol(s), $C_{8-22}$ fatty acid esters of polyglycol(s), $C_{8-22}$ fatty acid esters of polyalkylene glycol(s), $C_{8-22}$ fatty acid esters of glycerol, $C_{8-22}$ fatty acid esters of mono-, di-, or triethanolamine(s), and $C_{8-22}$ fatty acid esters of monosaccharide(s).

23. The redispersible polymer powder of claim 22, wherein said addition polymer is selected from the group consisting of vinyl acetate homopolymers; vinyl acetate and ethylene copolymers; copolymers of vinyl acetate and at least one further vinyl ester of an α-branched alkyl carboxylic acid; and copolymers of vinyl acetate, ethylene, and at least one vinyl ester of an α-branched alkyl carboxylic acid.

24. The redispersible polymer powder of claim 22, wherein said fatty compound is a $C_{8-22}$ fatty acid ester of a $C_{1-8}$ monohydric alcohol.

25. The redispersible polymer powder of claim 23, wherein said fatty compound is a $C_{8-22}$ fatty acid ester of a $C_{1-8}$ monohydric alcohol.

26. The composition of claim 22, wherein component b) is selected from the group consisting of tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, and mixtures thereof.

27. The composition of claim 24, wherein component b) is selected from the group consisting of tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, and mixtures thereof.

* * * * *